May 3, 1955
T. BALWICS
2,707,573
CONTAINER ATTACHMENT FOR LIFT TRUCKS
Filed June 5, 1952
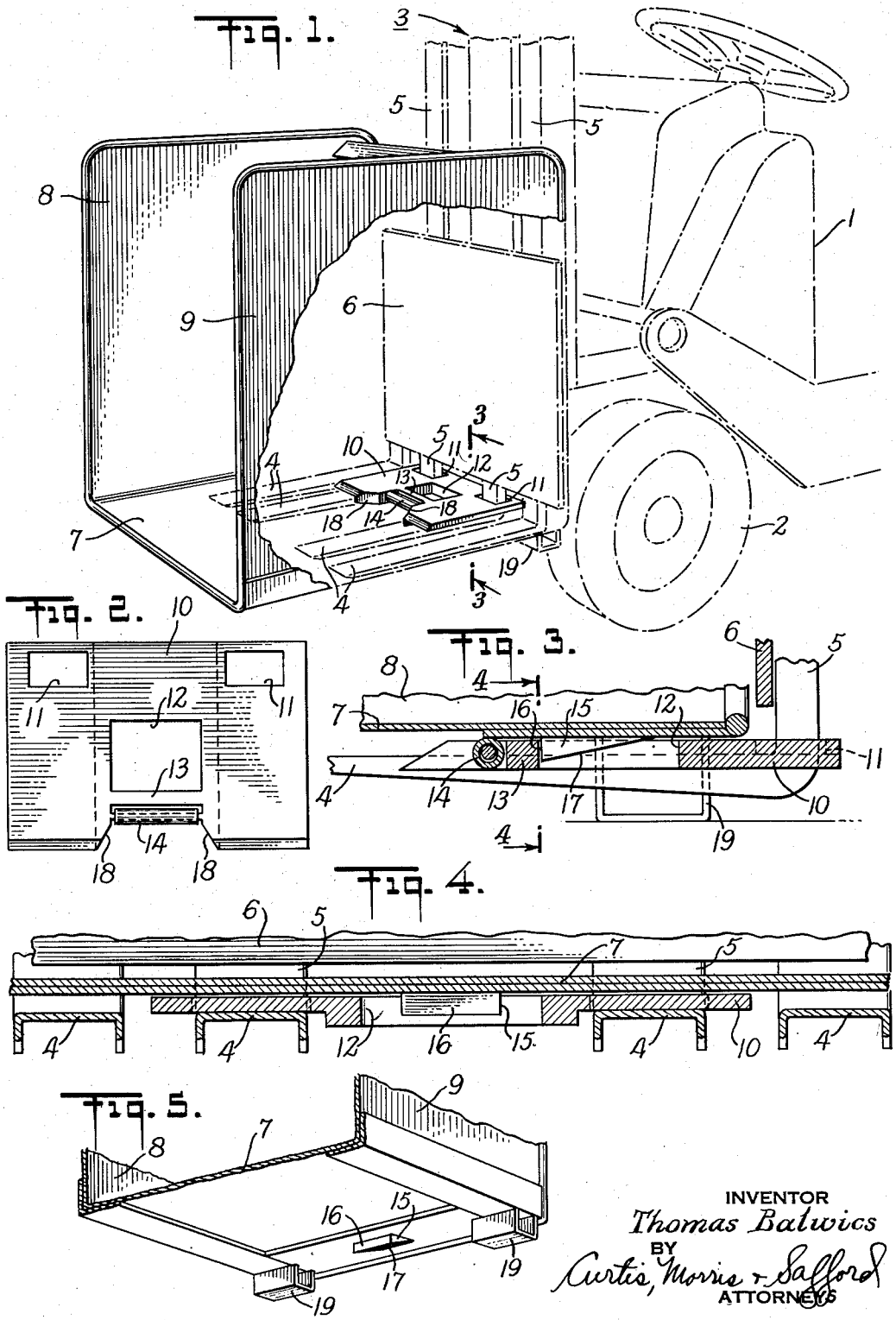
INVENTOR
Thomas Balwics
BY
Curtis, Morris & Safford
ATTORNEYS United States Patent Office 2,707,573
Patented May 3, 1955

2,707,573

CONTAINER ATTACHMENT FOR LIFT TRUCKS

Thomas Balwics, Keansburg, N. J., assignor to Penn Stevedoring Corporation, New York, N. Y.

Application June 5, 1952, Serial No. 291,941

9 Claims. (Cl. 214—621)

This invention relates to a power driven lift truck of the type used to transport and stack materials of various characters and forms.

One type of truck with which this invention is concerned comprises a wheel supported body portion, a mast, load supporting and elevating forks operable on the mast, a pusher for removing the load from the forks and power unit or units for propelling the driving wheels of the truck and for actuating the forks and pusher. In this type of truck, which is generally used for large and heavy loads, the operator, usually, is provided with a seat but in the type used for lighter and smaller loads, a platform is provided on which the operator stands.

In the drawing of this application the former type of truck is illustrated and the instant invention is shown as applied thereto in compliance with the statute.

In order to understand the importance of this invention it is desirable first to understand some of the operations in which these trucks are utilized and to understand some of the problems encountered in the handling of materials. Trucks of the heavy type illustrated in the drawing of this application are commonly used in picking up loads from storage space or from delivery trucks, transporting the load to a distant location and there depositing the load. As illustrative of such procedure, I shall refer to the transportation of loads of material from delivery trucks to freight cars, which is common practice on docks such as those of the North River in Manhattan. The materials to be transported are delivered overland by trucks to the docks. They are removed from the delivery trucks and transported from the trucks to freight cars which are on lighters for ferrying across the river to the New Jersey side for transportation, overland, by rail.

Many procedures have, from time to time, been followed in the handling of this material. One procedure was, to place a gang of men on the delivery truck and a gang of men on the dock. The material was passed from the first gang to the other who, in turn placed it, piece by piece, upon a pallet. The lift truck then approached and inserted the forks under the pallet, raised the pallet with its load and transported it to the freight car for unloading and stacking in the car. This procedure had many important disadvantages, among which was the extensive use of time and man power and the danger to which the workmen were subjected during unloading, transportation and stacking of the material. The danger was enhanced greatly when certain characters of materials were being handled. By way of example, I refer to the handling of bales of raw rubber, latex. These bales are irregular in form and weigh several hundred pounds each. They are difficult to handle and arrange upon the pallet and after arangement and during transportation they often fell from the pallet and, because of their inherent characteristics and irregular form, would bound about the docket in unpredictable directions. Thus, workmen in the vicinity were subjected to the danger of being hit and injured. Indeed this often occurred. The workmen were subjected to the same danger during unloading and stacking in the freight cars, where the danger was greater because the workmen were confined in a restricted space.

The efforts to overcome these disadvantages and dangers resulted in a change of equipment and procedure. The pallet has been replaced, to a great extent, by a material container of the general type illustrated in the drawing of this application which is constituted by a bottom and side walls, having open, front, back and top, the container being elevated from the floor by legs to provide space for the insertion of the forks of the truck beneath the container.

In the use of this lift truck and this container, the container is first picked up by the forks and moved to the delivery truck. It is then elevated substantially to the level of the bed of the truck. The loading gang on the delivery truck loads the container when in this position and as it is being loaded it may be lowered gradually. The provision of this type of container and this procedure made it possible to eliminate the use of the receiving gang on the dock and, thus, manpower and time was saved, and, to some extent, the danger of the load accidentally dropping from the lift truck as it was being transported, was reduced. But this did not eliminate the unloading and stacking gang in the freight car not did it eliminate the danger to the men handling the load.

The reason for this was that when the lift truck, with its load carried in the container, assumed its delivery position within the freight car, it could be operated by advancing the pusher simultaneously with the backing away of the truck. This resulted in the pushing of the container with its contained load from the forks thus leaving it to the gang to remove the load piece by piece from the container and to stack it in the car. This procedure could only be followed, however, when there was sufficient room behind the truck to permit the backing of the truck. It, moreover, involved again picking up the container after it had been emptied which, necessarily involved a loss of time. In this procedure the men were subjected to danger as the loaded container was being detached from the lift truck and as they were removing and stacking the material, the danger being greater with certain types of materials, such as the bale rubber mentioned. Of course it was also possible to unload the material from the container, after it had been transported into the freight car, without removing the container from the forks of the truck, but this wasted time and manpower because it was necessary for the truck to remain with the load.

In any event the unloading and stacking gang in the freight car was necessary when this type of container was used and this procedure was followed. Because of the small space within the freight car (which became smaller as loading progressed) the men were subjected to the danger of being injured by the load, accidentally dislodged, and, in fact, such accidents were not uncommon.

The present invention greatly reduces the man hours necessary to the unloading, transporting and subsequent stacking of such loads as heretofore referred to and, equally important, greatly reduces the possibility of injury to the men handling the material. Additionally, it makes it possible to stack the material in the container of the lift truck in the arrangement that is desired in the freight car or other place of deposit. Moreover, it gives the truck a space saving ability because the load may be delivered to the space in the freight car where it is to be stacked and then pushed from the container without necessitating the backing away of the truck during unloading. This is possible because of the fact that the load container is held to the truck as the load is being pushed therefrom.

In the drawing, I have illustrated one form of the invention and have shown it as applied to a truck of the heavy type, sufficient of the latter being shown in dot and dash lines to illustrate the manner in which the embodiment of the present invention cooperates therewith.

Figure 1 is a perspective view showing one form of the invention applied to the heavy type of lift truck.

Figure 2 is a plan view of an embodiment of the container attaching plate which is adapted to be applied to existent trucks.

Figure 3 is a vertical section on line 3—3 of Figure 1, the section being somewhat enlarged.

Figure 4 is a vertical section on line 4—4 of Figure 3; and

Figure 5 is a fragmentary perspective view looking at the bottom of the container and showing the detent that cooperates with the aforementioned plate to maintain the container on the forks of the truck.

In Figure 1 of the drawing a portion of the heavy type of lift truck is illustrated as including a body portion 1 which is mounted on supporting and propelling wheels, one of which is indicated at 2. At the forward end of the truck a mast 3 is mounted. This mast supports the usual forks 4 which are provided with vertical slides 5 that operate on the mast to raise and lower the forks. The elevation of these forks is accomplished by mechanism that is mounted on the truck in the usual manner and of course the truck is propelled by mechanism mounted on the body of the truck. The truck is also provided with a pusher 6 which is projected and retracted by suitable and well known mechanism mounted on the truck, the projection and retraction being over the forks 4, the latter to permit the load to be picked up by the forks and the former to eject the load from the forks or to maintain the load stationary while the truck is backed and the forks withdrawn from beneath the load.

The above described mechanism is well known and more or less standard in the practical art.

In the use of a truck of this type the load is ofttimes carried by a box-like container which comprises a bottom 7 and sides 8 and 9, the front and back and top of the container being open, or otherwise stated, the container being substantially U-shaped in transverse vertical cross-section.

The embodiment of the present invention comprises a releasable arrangement which will retain the container on the forks of the truck while the load is being ejected from the container either by being pushed therefrom by the pusher 6 or by being held stationary by the pusher while the truck withdraws the container from beneath the load.

I have shown an embodiment of my invention as applied to an already existent truck of the commercial type heretofore referred to, and this embodiment includes a plate 10 which is adapted to rest upon the forks 4 and is provided with openings 11 adjacent its rear edge which are sufficiently large to accommodate the vertical slide portions 5 of the forks 4 and which are, also, sufficiently large to permit the plate to be slid over the horizontal portions of the forks into the position shown in Figure 1.

This retaining plate 10 is provided with an opening 12 providing a transverse bar 13 forwardly of which is located an anti-friction and elevating roller 14.

The lower surface of the bottom 7 of the load container is provided with a detent 15 having an abrupt face 16 for engagement with the rear face of the bar 13 and a cam face 17 for engagement with the elevator roller 14, the detent 15 being of less length than the longitudinal dimension of the opening 12 in the plate 10 so that it may lie freely therein.

Forwardly of the elevating roller 14, the retaining plate 10 is provided with a pair of cam surfaces 18 which converge toward the roller for the purpose of guiding the detent 15 to the roller in the event that it may be laterally displaced in respect thereof when the forks 4 are inserted beneath the bottom of the load container, this insertion being made possible by the supporting of the container in a slightly elevated position by the legs 19.

Of course, it is to be understood that the illustrated embodiment of the invention is that which adapts it to an already existing truck and that, when the invention is to be embodied in a truck during its building, the features of the construction that are necessary to the adaptation for an already existing truck may be omitted and the plate 10 may be permanently attached to the truck, it being essential however, that there be a bar 13 or its equivalent for engagement with the detent 15, and it being desirable that the roller 14 and the cam surfaces 18 be included.

Even in adapting the invention to an existing truck, the plate 10 may be attached to the truck structure permanently rather than removably as illustrated in the drawing, and when so attached the method of attachment illustrated in the drawing may be modified, within the skill of the art.

To illustrate the use of this invention, when combined with a truck, and to set forth the advantages of such use in the saving of time and man-power and reducing the liability of accident and the proper stacking of the load for transportation, I shall describe the use where a quantity of sacks, as of coffee, for instance, is to be transported from a delivery truck to a distant point and loaded into a box freight car with a door on the side thereof.

The forks 4 are inserted beneath the bottom 7 of the load container by the operator of the transportation truck until the detent 15 lies within the opening 12 of the plate 10 with the face 16 of the detent adjacent the face of the cross-bar 13 so that the load container will be prevented from moving off of the forks. During this engagement of the forks beneath the container, as the forks move forwardly, the cam face 17 of the detent 15 engages the roller 14 and elevates the detent to a position where it may drop into the opening 12 and during this insertion of the fork, if they are laterally displaced with respect to the center line of the load container, the cam surfaces 18 will operate to align the detent 15 with the opening 12.

With the pusher 6 retracted, the operator may then elevate the container in the usual manner through mechanism carried by the truck until the bottom 7 thereof is at substantially the elevation of the topmost tier of bags on the delivery truck. A man or men may then transfer bags of the topmost tier to the load container 7 and arrange the bags in any manner in relation to each other that it is desired to have them stacked in the freight car. They may have their ends or sides abutting or overlapped. As tier after tier of the bags are removed from the delivery truck the load container may be lowered so that the space within the load container into which the bags are to be stacked will be at substantially the same vertical height as the bags on the delivery truck.

When the load container is completely loaded, it may finally be lowered to a position slightly above the supporting surface such as the floor of a dock and into the position shown in Figure 1.

Thus the need for a man or men to receive the bags from the delivery truck for loading into the container as heretofore described in the old practice, is not present when the invention of this application is used.

With the load container in its lowered position of Figure 1 and loaded to the desired extent, the truck may then, by its own propulsion means, transport the loaded container to the box car.

Presuming that the car is empty, the operator may cause the truck with its loaded container to move into the car through the side door thereof and then, because of the mobility of the truck, move the open forward end of the container to adjacent an end wall of the car. When this has been accomplished, the operator may then start the actuating mechanism for the pusher 6 and at the same time back the truck away from the load. This in effect will maintain the pusher 6 substantially stationary in respect of the car and it will, because of its engagement by the load such as the bags heretofore spoken of, maintain the loaded bags relatively stationary at the end of the car. At the same time the backward movement of the truck will withdraw the container from the load by withdrawing the bottom 7 thereof from beneath the load and this is made possible by the invention heretofore described. In other words the engagement of the detent 15 with the bar 13 will permit the withdrawal of the container from the load and the relative movement of the pusher 6 will maintain the load in its original position adjacent the end wall of the car. Thus the bags, if such there be, or any other load that is carried by the load container will be deposited on the floor of the car in substantially the same arrangement in relation to each other as they occupy in the load container.

This procedure may be continued until the car is fairly well loaded and then when it is undesirable to eject the load by backing the truck away from the load the truck may remain stationary and the pusher 6 caused to eject the load from the load container, which container will be retained by the truck because of the engagement of the detent 15 with the bar 13.

Thus the usual gang of men that are employed to unload from the truck and stack within the freight car may be eliminated.

Thus time and manpower will be economized, and safety will be enhanced because of the elimination of the men heretofore referred to and because of the elimination of the jeopardy in which they are placed by their presence in the freight car or adjacent the delivery truck.

This invention makes it possible to successfully and expeditiously handle and transport material when only a few men are available to receive, transport and stack loads of material which could not be thus received, transported and stacked without a greater number of men absent this invention.

The element of safety is particularly desirable when certain materials such as bales of raw rubber are being handled, for the resiliency of thus rubber makes the bales difficult to handle and transport and when they are accidentally dropped during the transportation or loading, their bouncing about coupled with their great weight is a tremendous source of danger.

While I have illustrated and described a particular form of my invention, it is to be understood that many changes in construction may be made without departing from the invention and without exceeding the scope of the claims.

What I claim is:

1. In a lift truck having substantially horizontal load supporting forks, a load container having open front and rear ends removably mounted on said forks, and a pusher movable longitudinally over said forks, the improvement which includes complemental separable fastener elements on said container and on said forks, the separable fastener elements on said forks comprising a plate removably mounted on said forks and having an abrupt latching face and the other of said separable elements comprising a detent on the bottom face of said container and having an abrupt latching face engageable with said first mentioned latching face, said detent including a cam face for guiding said abrupt face into surface-to-surface relationship upon relative movement of said forks and said container in one direction, and an anti-friction roller arranged forwardly of said abrupt latching face on said plate for engagement by said cam face on said detent during the relative movement of said forks and said container in one direction.

2. In a lift truck having substantially horizontal load supporting forks, a load container having open front and rear ends removably mounted on said forks, and a pusher movable longitudinally over said forks, the improvement which includes complemental separable fastener elements on said container and on said forks, the separable fastener elements on said forks comprising a plate removably mounted on said forks and having an abrupt latching face and the other of said separable elements comprising a detent on the bottom face of said container and having an abrupt latching face engageable with said first mentioned latching face, said detent including a cam face for guiding said abrupt face into surface-to-surface relationship upon relative movement of said forks and said container in one direction, and an anti-friction roller arranged forwardly of said abrupt latching face on said plate for engagement by said cam face on said detent during the relative movement of said forks and said container in one direction, said plate being provided with cam faces converging towards said roller for engagement by said detent to guide the latter into alignment with said roller.

3. In a lift truck having substantially horizontal load supporting forks, a load container having open front and rear ends removably mounted on said forks and a pusher movable longitudinally over said forks, the improvement which includes a plate removably mounted on and supported by said forks and having one element of a separable fastener, said container having the other element of said separable fastener engageable with and disengageable from said separable fastener element on said plate, said plate being provided with an anti-friction roller forwardly of a separable fastener element thereon for engagement by and for elevating the separable fastener element of said container during the relative movement of said forks and said container.

4. In a lift truck having substantially horizontally load supporting forks, a load container having an open front end removably mounted on said forks and a pusher movable longitudinally over said forks through said container, vertical slides extending upwardly from said forks, a plate having openings therein through which said slides extend to maintain said plate upon said forks, said plate having an opening in advance of said first mentioned openings and said container having a detent on its bottom surface engageable with said last mentioned opening, said plate having means to guide said detent into said last mentioned opening.

5. In a lift truck having substantially horizontally load supporting forks, a load container having an open front end removably mounted on said forks and a pusher movable longitudinally over said forks through said container, vertical slides extending upwardly from said forks, a plate having openings therein through which said slides extend to maintain said plate upon said forks, said plate having an opening in advance of said first mentioned openings and said container having a detent on its bottom surface engageable with said last mentioned opening, said plate at its forward edge being provided with cam surfaces to align said detent with said last mentioned opening in said plate.

6. In a lift truck having substantially horizontally load supporting forks, a load container having an open front end removably mounted on said forks and a pusher movable longitudinally over said forks through said container, vertical slides extending upwardly from said forks, a plate having openings therein through which said slides extend to maintain said plate upon said forks, said plate having an opening in advance of said first mentioned openings and said container having a detent on its bottom surface engageable with said last mentioned opening, said plate at its forward edge being provided with cam surfaces to align said detent with said last mentioned opening in said plate, said plate being provided with an anti-friction member located between said last mentioned opening and said cam surfaces for engagement by said detent.

7. In a lift truck having load supporting forks comprising horizontal elements and upwardly extending spaced vertical elements, the improvement which includes a plate detachably mounted upon and supported by both of said forks, said plate having vertical openings closed on four sides by both integral portions of said plate extending therethrough through which said vertical elements of said forks extend, a load container and complemental separable fastener elements on said plate and said container for attaching said container to said plate, said complemental fastener elements comprising a detent member on said load container and an opening in said plate forwardly of said vertical openings in which said detent is engageable.

8. In a lift truck having substantially horizontally spaced supporting forks, the improvement which comprises a plate removably mounted on and carried by said forks, said plate having an opening extending through its upper face between said forks and having an abrupt forward face, a load carrying pallet removably mounted on said forks and said plate and a detent carried by the lower face of said pallet, said detent having an abrupt forward face engaged with the abrupt forward face of said opening in said plate and having a rearwardly and upwardly inclined face extending from said abrupt forward face of said detent constructed and arranged to engage with said plate forwardly of said opening during the relative movements of said plate and said pallet.

9. The combination of elements recited in claim 8 wherein an anti-friction roller is mounted forwardly of said abrupt face of said plate for engagement by the inclined face of said detent element on said pallet.

References Cited in the file of this patent
UNITED STATES PATENTS

| | | |
|---|---|---|
| 1,742,738 | Turner | Jan. 7, 1930 |
| 1,985,362 | Clyde | Dec. 25, 1934 |
| 2,182,005 | Stetson | Dec. 5, 1939 |
| 2,256,454 | Bomar | Sept. 16, 1941 |
| 2,388,458 | Alfonte | Nov. 6, 1945 |
| 2,482,692 | Quales et al. | Sept. 20, 1949 |
| 2,523,271 | Bartel | Sept. 26, 1950 |
| 2,581,364 | Cushman | Jan. 8, 1952 |
| 2,610,751 | Bevan | Sept. 16, 1952 |